United States Patent
Muskulus

[15] 3,691,606
[45] Sept. 19, 1972

[54] APPARATUS FOR ASSEMBLING COILS ONTO STATORS OF ELECTRIC MACHINES AND THE LIKE

[72] Inventor: Willie Muskulus, An der Pfaffenmauer 17, 6 Bergen-Enkheim, Germany

[22] Filed: April 15, 1971

[21] Appl. No.: 134,321

[30] Foreign Application Priority Data

April 24, 1970 Germany..........P 20 19 925.1

[52] U.S. Cl. ............................................. 29/205 D
[51] Int. Cl. .............................................. H02k 15/06
[58] Field of Search..29/205 D, 205 R, 205 C, 203 R

[56] References Cited

UNITED STATES PATENTS 3,324,536 6/1967 Hill et al. .................. 29/205 R
3,602,972 9/1971 Droll........................29/205 D Primary Examiner—Thomas H. Eager
Attorney—Larson, Taylor and Hinds

[57] ABSTRACT

For assembling wound coils into stator grooves, an apparatus for transporting transfer tools between different stations including a winding station whereat the transfer tools receive wound coils and drawing-in stations whereat the coils on the transfer tools are drawn into the stator grooves. A plurality of transport carriages, each having a transport tool thereon, are moved along a rail in a closed path to the various stations. The size and shape of the path can be varied. Each transport carriage can stop or move along the path independently of the other transport carriages.

8 Claims, 3 Drawing Figures

INVENTOR
WILLI MUSKULUS

INVENTOR
WILLI MUSKULUS

ATTORNEYS

3,691,606

APPARATUS FOR ASSEMBLING COILS ONTO STATORS OF ELECTRIC MACHINES AND THE LIKE

BACKGROUND OF THE INVENTION

This invention relates to the insertion of wound coils into the grooves of stator cores for electrical machines and the like, and in particular, it relates to an apparatus for transporting transfer tools including means for mounting stator cores and wound coils thereon between various manufacturing stations including one or more coil winding stations and one or more drawing-in stations at which the wound coils are drawn into the stator grooves.

In the production of stators for electrical machines or the like, use is normally made of a transfer tool. Wound coils and an empty stator core are placed onto this tool which is then brought into position to cooperate with a drawing-in device which urges the coils into the stator grooves. Examples of such transfer tools and drawing-in devices are shown, by way of example, in the Hill U.S. Pat. No. 3,324,536, and a suitable drawing-in tool is shown in the Droll, U.S. patent application Ser. No. 835,704, filed June 23, 1969, now U.S. Pat. No. 3,624,891, which application is commonly owned with the present application.

In accordance with known techniques for assembling wound coils onto stator grooves, the transfer tool is normally transported from station to station on a rotating table. Because of its low requirement for space, its simple construction and therefore its low cost, the rotating table is often quite suitable. However, it has been realized heretofore that the rotating table has disadvantages which often outweigh the advantages. For example, wound stators having different coil characteristics (different numbers of coils and different size coils) will be produced from time to time. Of course the rotating table can be used for stators having any characteristics. However, regardless of how many transfer tools are on the rotating table at any given time, since they can all move only when the table rotates, the speed of movement of all transfer tools from station to station will be limited by the "bottleneck" which will be the operating step in the overall process which lasts the longest time. Consequently, there is considerable wasted machine time as the transfer tools at other stations must often sit idle. Another disadvantage of known rotary tables is their poor capacity to adapt not only to different programs for producing stators having different winding characteristics but also a poor capacity to adapt to increases in output. For example, if one assumes that the coil winding process takes a very long time while the drawing-in device is capable of operating very rapidly, then in the use of a rotating table, the overall production rate can be increased only by having a plurality of rotating tables operating one beside the other, each of them being equipped with a drawing-in device. It is not possible without great difficulty to supply drawing-in devices on rotating tables with several winding arrangements operating in parallel. Thus, there exists a need for new and improved means for handling transfer tools so as to permit a more efficient production of wound stators, especially when it is desirable to produce stators having different winding characteristics.

SUMMARY OF THE INVENTION

Thus, it is a purpose of the present invention to provide, for the assembly of wound coils into stator grooves, a new and improved apparatus for transporting a plurality of transfer tools between different operating stations, which apparatus is more easily adaptable to variations in production output and changes in the winding characteristics of the wound stators being formed.

This purpose of the present invention is achieved by providing a guide track or rail arranged in the form of a closed path and by locating thereon for movement therealong a plurality of transport carriages, each of which carriages has mounted thereon a transfer tool. The closed path carries the transport carriages, and hence the transfer tools to all of the operating stations including the coil winding station, the stator core applying station, the drawing-in station, and the finished wound stator removal station. Actually, a feature of the invention is that the shape and size of the guide track or rail can be varied such that it can vary the arrangement and number of each of the above mentioned stations. The carriages are mounted on the guide track such that each carriage, and hence each transfer tool can be moved along the track or stopped independently of all other transport carriages.

The above arrangement provides several advantages. For example, the number and arrangement of the stations can be varied. Thus, in a process in which the time for winding coils is three times as long as the time for drawing the coils into the stator, then three winding stations can be arranged side by side to form windings for three separate transfer tools. All three transfer tools can then be moved on to a common drawing-in tool which can draw the coils into the stators on these three transfer tools, in sequence, during the same time that the said three winding stations are forming coils for three further transfer tools. This is made possible, inter alia, because movement of the first mentioned group of transfer tools through the drawing-in station is independent of movement of the second group of three transfer tools and hence can move through the drawing-in station while the second group of three transfer tools are stationary and receiving wound coils thereon. This example is only illustrative as there are an unlimited number of variations depending upon production needs.

In accordance with preferred features of the present invention, the endless guide track may take the form of a rail on which the carriages are mounted for movement therealong. The carriages may be driven by an endless chain which moves continuously along the rail. Each carriage can have a sprocket continuously engaging this chain and selectively operated for free rotation about its axis (as a result of which the relevant carriage will remain stationary as the chain simply rotates the sprocket about its axis) or against rotation about its axis, as a result of which the teeth engaging the chain cause the carriage to travel along with the chain. In accordance with another feature of the invention, a means may be provided for positively holding each carriage stationary when it reaches an operating station.

Thus, it is an object of this invention to provide a new and improved apparatus for transporting transfer tools in the production of assembling wound coils into stators.

It is another object of this invention to provide an apparatus for handling transfer tools in the production of wound stators, which apparatus is easily adaptable to varying production volumes and the production of stators having different winding characteristics.

It is another object of this invention to provide an apparatus for carrying transfer tools to different stations in the formation of wound stators, wherein a plurality of transfer tools are moved along a closed path and wherein the speed of movement, if any, of each carriage is independent of movement of all other carriages.

Other objects and advantages of the present invention will become apparent from the detailed description to follow, together with the accompanying drawings.

BRIEF DESCRIPTION OF THE DRAWINGS

There follows a detailed description of preferred embodiments of the present invention to be read together with the accompanying drawings.

DETAILED DESCRIPTION OF THE PREFERRED EMBODIMENTS

Figure 1:
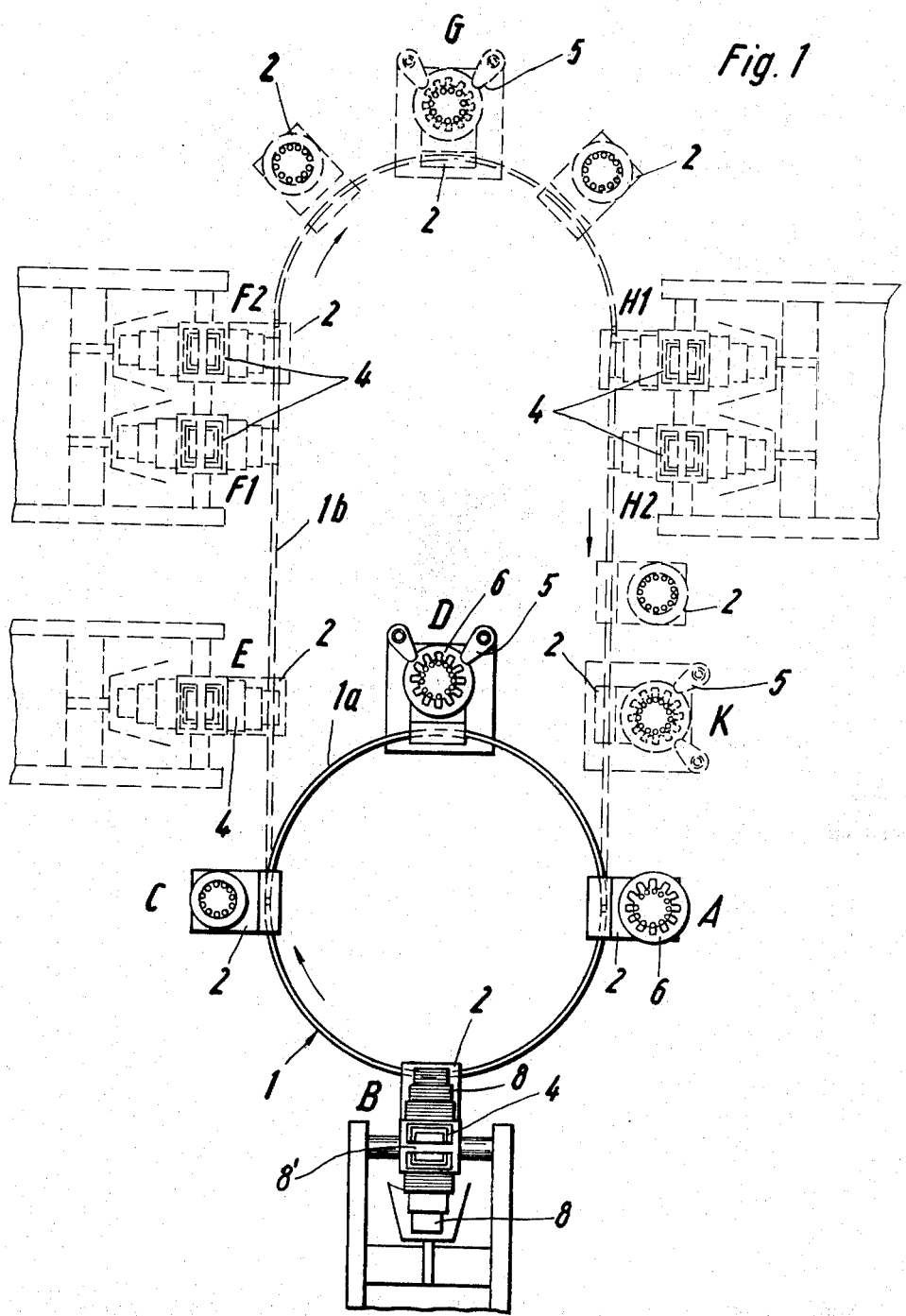
FIG. 1 is a plan view of an apparatus constructed in accordance with the features of the present invention with one arrangement shown in solid lines and a variation thereof shown in dotted lines.

Referring now to the drawings, like numerals represent like elements throughout the several views.

The apparatus shown in the drawing comprises a guide track in the form of a rail 1 forming a closed path and constituted by diversified individual segments, for example bent and straight tracks 1a and 1b, respectively, along which transport carriages 2 with transfer tools 3 (see FIGS. 2 and 3) move. The carriages 2 can be arrested and clamped without maintaining a common cycle time at the individual production stations arranged on the guide rail 1. As production stations, winding devices 4 and drawing-in devices 5 are indicated in FIG. 1. These devices have been known per se and their details do not constitute the object of the present invention and hence they will not be discussed in detail. However, for a more detailed disclosure of a suitable winding device 4, reference is made to the Droll U.S. application Ser. No. 868,482 filed Oct. 22, 1969, which application is commonly owned with this application. For a more detailed disclosure of suitable drawing-in devices 5, reference is made to the said Hill Patent and the said Droll U.S. application Ser. No. 835,704.

Figure 2:
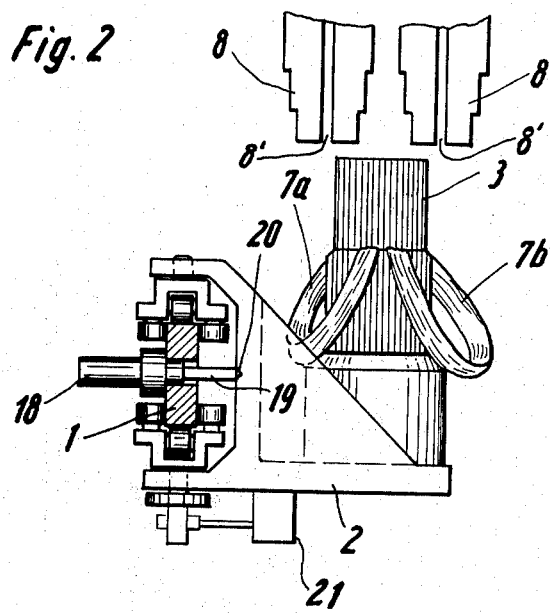
FIG. 2 is an elevational view of a portion of FIG. 1 located at station B thereof.
Figure 3:
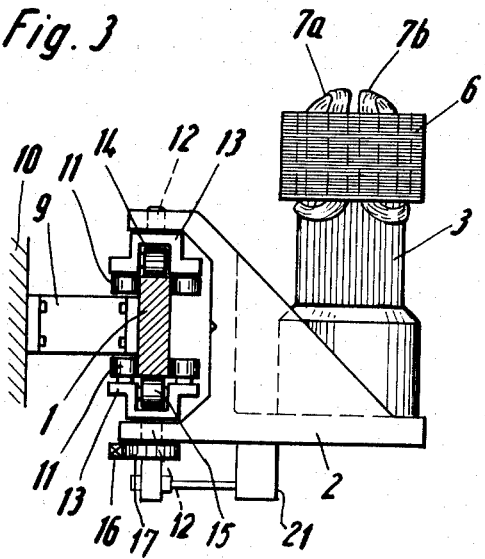
FIG. 3 is an elevational view of a portion of FIG. 1 located at station A thereof.

A production device, simple in its structure, has been shown in FIG. 1 in solid lines. It operates as follows:

Assume that the transport carriage 2 which is shown on the right side at position A carries a completely wound stator 6 as shown in FIG. 3. The stator 6 can now be lifted off the transport tool 3 by hand or by machine (not shown). The transfer tool 3 comprises a gathering ring of transfer bars which likewise is known per se. The empty transport carriage 2 then moves along guide rail 1 to the winding station B, at which is located a winding device 4. In front of said device 4 there might possibly be other empty transport carriages 2 waiting to be wound at device 4. The groups of coils received at station B to be drawn into the stator 6 are designated by 7a and 7b in FIGS. 2 and 3. These coils are wound on the winding device 4 onto templates 8 and are transferred with the aid of a transfer tool 3 each time to that carriage 2 which has been moved into position below winding device 4 and held there in a clamped down manner. For this purpose, as shown in FIG. 2, the groups of coils 7a and 7b are transferred simultaneously from two templates 8. The individually wound templates 8 with coils 7a and 7b wound thereon are folded into the parallel perpendicularly downward pointing position as shown in FIG. 2 necessary for the transfer. The bars of transfer tool 3 are then moved a certain length axially upward into templates 8. Then, after a reduction in the outer dimensions of templates 8, by closing of the gap 8' shown in FIG. 2, the coils 7a and 7b or corresponding groups of coils 7a and 7b are pulled by hand or by means of a gripping device, not shown, and are taken from the templates and pulled over onto transfer tool 3, and finally templates 8 and the bars of tool 3 are moved apart axially. The relative axial movement of templates 8 and the transfer tool 3 can be accomplished by an elevating mechanism on the winding device, on the guide rail 1 or between tool 3 and transport carriage 2. A suitable quick transfer device for transferring wound coils from templates onto transfer tools is shown in greater detail in the Droll U.S. application Ser. No. 868,371, filed Oct. 22, 1969, now U.S. Pat. No. 3,602,972, which application is commonly owned with this application.

When a larger number of groups of coils is to be drawn into the periphery of a stator 6 and distributed in said stator, it is possible to wind the various groups of coils one after the other on the same winding device 4 and to transfer them individually or in groups of several, one after the other, from the templates 8 to the tool 3 which, in the meantime is turned each time by a certain angle. In this case a rotational drive will also have to be provided for tool 3 on carriage 2, and carriage 2 will be held below the winding device 4 for a sufficient length of time until all coil groups have been wound one after the other and have been pulled over one after the other onto tool 3 in the correct mutual position between its bars. Then transport carriage 2, its tool 3 now loaded with coils, moves on guide rail 1 and the next empty carriage 2 is moved by the follow-up control underneath winding device 4.

An empty laminated stator core is then placed onto the transfer tool 3 at the next following operating station C, for example it is placed onto the upper end of the bars of transfer tool 3. This can be accomplished by machine or manually. Then, at the following operating station D, the coil groups 7a and 7b, which are hung between the bars of tool 3, are drawn by means of a drawing-in device 5 into the grooves of the stator core 6 held on the bars, whereupon the initial state according to FIG. 3 will again be reached at operating station A.

In the case of the apparatus described, it is important to note that all production and operation stations need not operate in the same cycle and that transport carriages 2 may delay in a waiting position between the operating stations. Naturally, in this case one production station in the long run must not operate more quickly or more slowly than another one and it was for this reason that in the case of the simple embodiment given by way of example with the production stations A, B, C and D, it was described with the capacities of all production stations being brought into balance with one another for a certain production program. However, the difference between the present invention and the heretofore used rotary table will really become more apparent when the production program is to be changed, for example whenever a different stator is to be wound with more or less, larger or smaller coils with the available devices and/or whenever the number of stators produced per hour is to be increased.

A further development of the apparatus is indicated by broken lines in FIG. 1. In this case, the following remarkable operating possibilities are to be obtained.

Several winding devices, for example, at production stations B, E, F1 and F2, can be connected in series to produce variable groups of coils for transfer in succession to the same tool 3. Whenever the winding processes take a very long time, the winding devices disposed in succession on the guide rail 1 can operate in parallel, for example, winding the same group of coils and hooking them in at the same places in three separate transfer tools 3. All tools which have thus received coils from the winding devices operating in parallel then shift forward together into the waiting position in front of production station G at which a sufficiently fast automatic drawing-in mechanism 5 draws in all coils manufactured in parallel operation at a rate independent of the operating cycle of the winding devices which may even operate at different speeds relative to each other. Naturally in the case of this parallel method of operation with several production stations located one behind the other, the transfer tools 3 which have already been completely supplied with groups of coils must be able to move past a winding device en route to the drawing-in device 5. But this causes no difficulties in control techniques.

Whenever several similar production stations carry out the same work in parallel, for example winding devices F1 and F2 or H1 and H2, then that will result in extraordinarily advantageous simplifications for the system, the drive and the control.

As can be seen in FIG. 1, it is also possible to repeat the same production cycle several times along the periphery of a guide rail. It is even possible to balance the operating capacity between separate series connected portions of the production rails; for example, between the two groups of operating stations B, C, E, F1, F2, G on the one hand and H1, H2, K, on the other hand, via the storage locations between the production stations on which the transport carriages stand waiting to be reused. This capacity balance between the two groups of production stations, possibly also operating independently by themselves, is possible only because the same transport carriages run one after the other past the production stations of both groups mentioned, each of which by itself may be considered as an individual production track. Therefore, whenever the drawing-in mechanism of production station G is overloaded, then several transport carriages 2 waiting in front of it are allowed to pass through without stopping, thereby also passing by the winding devices H1 and H2, and are finished by the drawing-in mechanism of production station K which otherwise has not been loaded.

The arrangement drawn in a broken line in FIG. 1 also can be used for the purpose of making windings of an auxiliary phase on one stator by using several winding devices, for example receiving coils at B, E and F, drawing these in at G, and then producing the main windings at H1 and H2, which are then drawn in at K.

FIGS. 2 and 3 show the means for guiding and arresting transport carriages 2 on the guide track 1. The rail 1 is attached via a holding arrangement 9 to a wall or base 10. Carriages 2 are guided by rollers 11 running on the lateral surfaces of guide rail 1. Two rollers 11 are mounted near the top and two near the bottom of rail 1. These rollers 11 are supported in mountings 13 which are in turn pivotably mounted to vertical pivot axles 12. Rollers 14 running on the top side of guide track 1 and rollers 15 running on the underside are also connected to mountings 13. The swivelable mounting of rollers 11 is necessary because of the curvature of guide rail 1.

The drive of all transport carriages 2 is accomplished in the case of the embodiment shown, by way of example, by a chain 16 continuously rotating below the guide rail 1, which is engaged by a sprocket wheel 17 connected one on each transport carriage 2. On the axle of each said sprocket wheel 17 is positive or friction clutch 21, which clutch either locks sprocket wheel 17 to prevent its rotation about its axis upon receiving a control impulse, so that the transport carriage 2 associated therewith is driven by the revolving chain 16 along the path of guide rail 1, or else it allows sprocket wheel 17 to rotate freely about its axis so that its respective carriage 2 is not driven by chain 16.

Control of the lock of each sprocket wheel 17 acts together each time with an arresting device at the individual production stations. As shown in FIG. 2, such an arresting device can comprise a pneumatic cylinder 18 attached to guide rail 1, which pushes an arresting bolt 19 into the path of the passing carriage 2, which bolt engages with a bore 20 of the carriage 2.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. An apparatus for assembling coils onto stators of electric machines or the like comprising, a guide rail arranged in the form of a closed path, a plurality of transport carriages mounted on said guide rail for movement along said path, a transfer tool on each said transport carriage, each said tool including a means for holding groups of wound coils and a stator core, at least one coil winding machine adjacent said path and including a winding device for winding coils to be placed onto the transfer tool as the latter passes through the winding station, at least one drawing-in station adjacent said path and including a drawing-in device for drawing wound coils arranged on a given transfer tool into a stator coil also mounted on that transfer tool, and a drive means for driving the said transport carriages containing the transfer tools along said path such that each transport carriage can be moved therealong or stopped independently of the other of said transport carriages.

2. An apparatus according to claim 1, wherein said guide rail is made up of a plurality of individual segments arranged to form said closed path, whereby the length and shape of the path can be varied by varying the number and arrangement of the segments forming said path.

3. An apparatus according to claim 1, including a plurality of coil winding stations and a plurality of drawing-in stations arranged along said path.

4. An apparatus according to claim 1, wherein said drive means comprises an endless, continuously moving driving member which follows the said closed path, individual drive elements on each said transport carriage and control means for causing each said driving element to either drivingly engage the driving member to be driven thereby along the path, or non-drivingly engage the said driving member such that its carriage is not driven along the path.

5. An apparatus according to claim 4, wherein each driving element comprises a rotating member continuously engaging the said driving member, and wherein the control means comprises a means for permitting the driving element to be rotated freely about its axis by the driving member whereby the driving element is not moved along said path or preventing rotation of the driving element about its axis whereby it and its transport carriage are moved along said path by the said driving member.

6. An apparatus according to claim 5, wherein the driving member is a chain, the driving elements are sprockets, the teeth of which continuously engage the chain, and wherein the control means comprises a friction clutch selectively engaging the said sprocket wheel to either permit or prevent rotation thereof about its axis.

7. An apparatus according to claim 4, including arresting means for positively locating and arresting the carriages at the said stations.

8. An apparatus according to claim 7, said arresting means including a bolt mounted on the rail at each station, and movable into a bore in a transport carriage located at that station to positively hold the same.

* * * * *